United States Patent [19]

Makabe et al.

[11] Patent Number: 5,226,928
[45] Date of Patent: Jul. 13, 1993

[54] REFORMING APPARATUS FOR HYDROCARBON

[75] Inventors: Teruo Makabe; Hidetaka Sato; Akifusa Hagiwara, all of Tokyo; Mamoru Aoki, Kobe; Hideki Sugimura, Kakogawa; Toshizo Kawabata, Hyogo, all of Japan

[73] Assignees: The Tokyo Electric Power Company, Incorporated, Tokyo; Kabushiki Kaisha Kobe Seiko Sho, Kobe, both of Japan

[21] Appl. No.: 632,984

[22] Filed: Dec. 24, 1990

[30] Foreign Application Priority Data

Dec. 26, 1989 [JP] Japan ............................. 1-339139
Apr. 27, 1990 [JP] Japan ............................. 2-112224

[51] Int. Cl.⁵ .......................... B01J 7/00; B01J 8/06
[52] U.S. Cl. ............................ 48/94; 48/127.9; 422/200; 422/204; 422/211
[58] Field of Search .............. 422/204, 206, 211, 201, 422/200, 212, 192, 193; 48/198.7, 127.9, 94; 429/17, 19

[56] References Cited

U.S. PATENT DOCUMENTS

| | | | |
|---|---|---|---|
| 3,144,312 | 8/1964 | Mertens | 48/95 |
| 3,541,729 | 11/1970 | Dantowitz | 48/94 |
| 3,909,299 | 9/1975 | Corrigan | 48/127.9 |
| 4,650,727 | 3/1987 | Vanderborgh et al. | 422/193 |
| 4,678,600 | 7/1987 | Stahl et al. | 252/373 |
| 4,692,306 | 9/1987 | Minet et al. | 48/94 |
| 4,746,329 | 5/1988 | Christner et al. | 422/204 |
| 4,849,187 | 7/1989 | Uozu et al. | 48/94 |
| 4,861,398 | 8/1989 | Koyama et al. | 48/94 |
| 4,909,808 | 3/1990 | Voecks | 48/127.9 |

FOREIGN PATENT DOCUMENTS

| | | |
|---|---|---|
| 50-151790 | 12/1975 | Japan . |
| 53-13412 | 5/1978 | Japan . |
| 53-78992 | 7/1978 | Japan . |
| 53-79766 | 7/1978 | Japan . |
| 53-79768 | 7/1978 | Japan . |
| 56-105745 | 8/1981 | Japan . |
| 57-1482 | 1/1982 | Japan . |
| 57-7538 | 2/1982 | Japan . |
| 57-192489 | 11/1982 | Japan . |
| 58-124530 | 7/1983 | Japan . |
| 59-102801 | 6/1984 | Japan . |
| 60-103001 | 6/1985 | Japan . |
| 61-247601 | 11/1986 | Japan . |
| 63-27972 | 6/1988 | Japan . |

Primary Examiner—Peter Kratz
Attorney, Agent, or Firm—Oblon, Spivak, McClelland, Maier & Neustadt

[57] ABSTRACT

A reforming apparatus for hydrocarbon includes a first annular passage forming an outside stock gas passage filled with a catalyst. A second annular passage is arranged just inside of the first annular passage and in concentric relationship therewith to form an outside reformed gas passage. A third annular passage is arranged just inside of the second annular passage, and is connected thereto via a third communicating portion, for forming an inside reformed gas passage. A fourth annular passage is arranged just inside of the third annular passage and is connected between the first and third annular passages by first and second communicating portions, respectively, for forming an inside stock passage filled with the catalyst for reforming the stock gas. A first combustion gas passage is formed just inside of the fourth annular passage and a second combustion gas passage is formed just outside of the first annular passage, for heating the fourth and first annular passages, respectively. A flow direction of the stock gas in the outside stock gas passage is counter to that of a combustion gas in the second combustion gas passage, while a flow direction of the stock gas in the inside stock gas passage is counter to that of a combustion gas in the first combustion gas passage. A flow direction of the reformed gas in the inside reformed gas passage is counter to that of the stock gas in the inside stock gas passage, while a flow direction of the reformed gas in the outside reformed gas passage is counter to that of the stock gas in the outside gas passage.

3 Claims, 6 Drawing Sheets

REFORMING APPARATUS FOR HYDROCARBON

BACKGROUND OF THE INVENTION

The present invention relates to a hydrocarbon reforming apparatus for producing a reformed gas containing hydrogen as a primary component by steam reforming a hydrocarbon stock, and more particularly to a hydrocarbon reforming apparatus suitable for a fuel cell requiring a compact structure and a high heat efficiency.

A reforming apparatus for producing a reformed gas (a combustible gas containing hydrogen as a primary component, carbon monoxide, methane, etc.) by making a mixture of hydrocarbon such as fuel oil, naphtha or natural gas with steam pass a catalyst layer is known from Japanese Patent Laid-open Publication Nos. 53-78992, 53-79766 and 58-63783 and Japanese Patent Publication No. 57-7538, for example.

In the above known reforming apparatus, a reactor tube having a double structure is provided in a reactor. In the double structure, an outer layer portion and an inner layer portion are formed, and they are communicated with each other at upper ends thereof. The outer layer portion is filled with a catalyst to form a catalyst layer. The catalyst in the outer layer portion is heated by a combustion gas flowing along an outer circumferential surface of the reactor tube. A stock gas is supplied to pass through the catalyst layer heated by the combustion gas, so that the stock gas is reformed. Then, a reformed gas thus obtained is discharged through the inner layer portion to the outside of the reactor.

However, the temperature of the combustion gas to be exhausted from the reforming apparatus is remarkably high, and a retention heat of the combustion gas is not efficiently utilized. Further, as the temperature of the reformed gas to be produced is also high, a large heat exchanger for cooling the reformed gas is required. To sufficiently utilize the heat of the combustion gas and the reformed gas until they are discharged from the reforming apparatus, it can be considered that the reactor tube is enlarged in size to increase a heat exchange area of the catalyst layer. However, such a method is not suitable for the reforming apparatus for a fuel cell in particular, which requires a compact structure.

SUMMARY OF THE INVENTION

It is a primary object of the present invention to provide a reforming apparatus for hydrocarbon which is compact and simple in structure to reduce an installation cost.

It is another object of the present invention to provide a reforming apparatus for hydrocarbon which can effectively transfer heat of a combustion gas and a reformed gas to a stock gas to thereby improve the heat efficiency.

It is a further object of the present invention to provide a reforming apparatus for hydrocarbon which can reduce the temperature of the exhaust combustion gas and the reformed gas to thereby reduce a material cost of refractories for a gas piping.

It is a still further object of the present invention to provide a reforming apparatus for hydrocarbon which can reduce a heat exchange capacity in a reformed gas cooling apparatus to be connected on the outlet side of the reforming apparatus.

According to the present invention, there is provided a reforming apparatus for hydrocarbon comprising a first annular passage forming an outside stock gas passage filled with a catalyst for reforming a stock gas; a second annular passage arranged just inside of said first annular passage in concentric relationship therewith, forming an outside reformed gas passage; a third annular passage arranged just inside of said second annular passage in concentric relationship therewith, forming an inside reformed gas passage; a fourth annular passage arranged just inside of said third annular passage in concentric relationship therewith, forming an inside stock gas passage filled with said catalyst for reforming said stock gas; a first communicating portion for communicating an axial end of said first annular passage with an axial end of said fourth annular passage to guide said stock gas from said outside stock gas passage to said inside stock gas passage; a second communicating portion for communicating another axial end of said fourth annular passage with an axial end of said third annular passage to guide a reformed gas generated from said inside stock gas passage to said inside reformed gas passage; a third communicating portion for communicating another axial end of said third annular passage with an axial end of said second annular passage to guide said reformed gas from said inside reformed gas passage to said outside reformed gas passage; a first combustion gas passage formed just inside of said fourth annular passage, for heating said fourth annular passage; and a second combustion gas passage formed just outside of said first annular passage, for heating said first annular passage; wherein a flow direction of said stock gas in said outside stock gas passage is counter to that of a combustion gas in said second combustion gas passage; a flow direction of said stock gas in said inside stock gas passage is counter to that of a combustion gas in said first combustion gas passage; a flow direction of said reformed gas in said inside reformed gas passage is counter to that of said stock gas in said inside stock gas passage; and a flow direction of said reformed gas in said outside reformed gas passage is counter to that of said stock gas in said outside stock gas passage.

Other objects and features of the invention will be more fully understood from the following detailed description and appended claims when taken with the accompanying drawings.

DETAILED DESCRIPTION OF THE PREFERRED EMBODIMENTS

Figure 1:
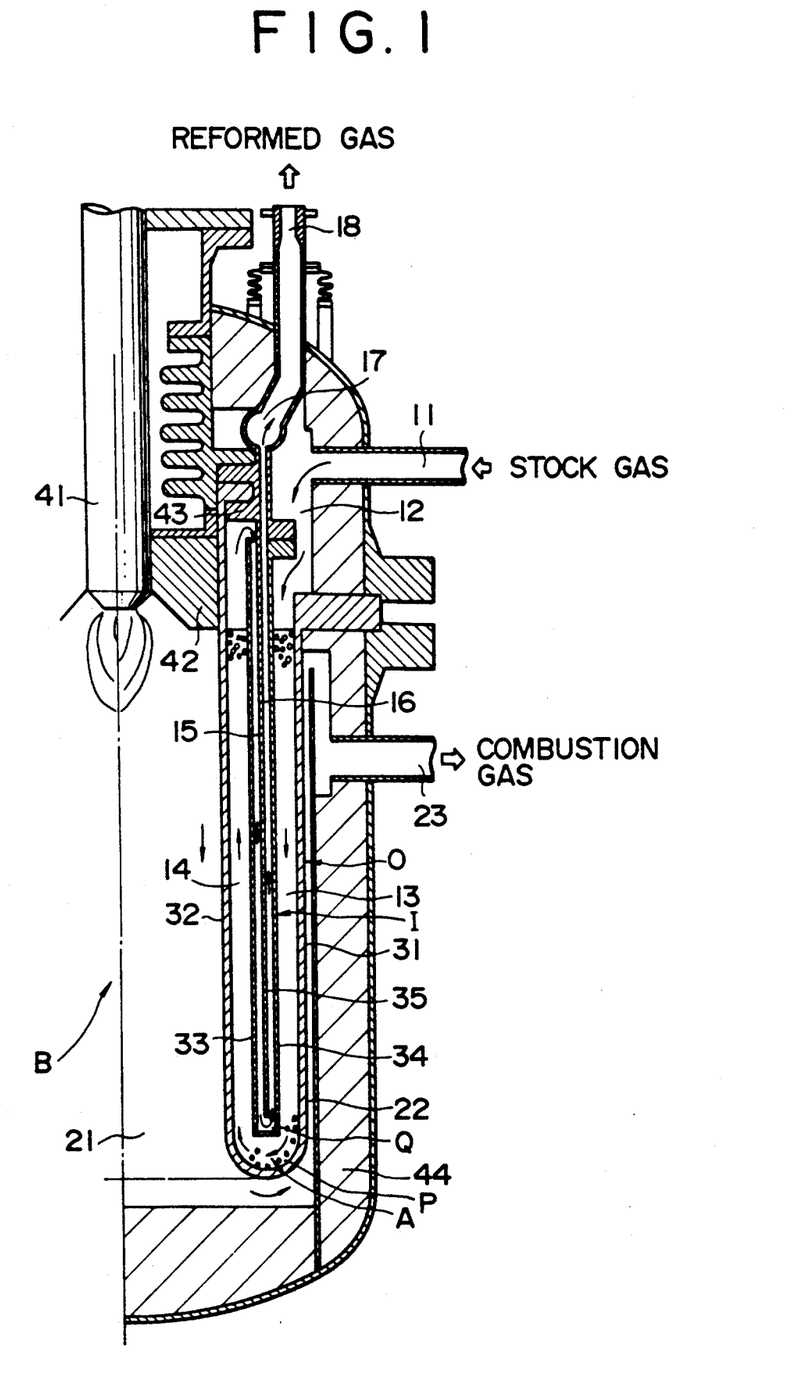
FIG. 1 is a vertical sectional view of a first preferred embodiment of the reforming apparatus according to the present invention, a left half thereof being cut away.

Referring now to FIG. 1 which shows a first preferred embodiment of the present invention, a substantially cylindrical reactor is lined with a heat insulating material 44. An annular outer tube O having a U-shaped cross section is fixed to the reactor so as to depend from a top portion of the reactor. A reacting portion A is formed in the annular outer tube O. The annular outer tube O is comprised of an outside circumferential portion 31 and an inside circumferential portion 32 integrally connected with each other at a bottom end thereof. On the other hand, an annular inner tube I having a U-shaped cross section is also fixed to the reactor so as to be located in the annular outer tube O, that is, between the outside circumferential portion 31 and the inside circumferential portion 32 of the annular outer tube O. The annular inner tube I is comprised of an inside circumferential portion 33 and an outside circumferential portion 34 integrally connected with each other at a bottom end thereof. Further, an annular partition plate 35 is also fixed to the reactor so as to be located in the annular inner tube I, that is, between the inside circumferential portion 33 and the outside circumferential portion 34 of the annular inner tube I. Thus, the reacting portion A is formed in a space defined between the annular outer tube O and the annular inner tube I, so that an annular outside reacting portion 13 and an annular inside reacting portion 14 are so formed as to be communicated with each other through a bottom communicating portion P. A reforming catalyst such as a nickel-alumina catalyst as a typical catalyst is filled in the reacting portion A. On the other hand, a space defined in the annular inner tube I is partitioned by the annular partition plate 35 to form an annular inside passage 15 for allowing passage of a reformed gas fed from the inside reacting portion 14 and an annular outside passage 16 communicated with the annular inside passage 15 through a bottom communicating portion Q.

Thus, there are defined in the annular outer tube O four concentric annular passages consisting of a first annular passage as the outside reacting portion 13, a second annular passage as the outside reformed gas passage 16, a third annular passage as the inside reformed gas passage 15, and a fourth annular passage as the inside reacting portion 14.

In operation, a stock gas is supplied from a stock gas inlet nozzle 11 through an inlet passage 12 into the outside reacting portion 13. Then, the stock gas flows downwardly in the outside reacting portion 13, passing through the bottom communicating portion P, and then flowing upwardly in the inside reacting portion 14. During this course, the stock gas is reformed. A reformed gas generated from the inside reacting portion 14 is turned down at its upper end to enter the inside reformed gas passage 15. Then, the reformed gas flows downwardly in the inside reformed gas passage 15, passing through the bottom communicating portion Q, and then flowing upwardly in the outside reformed gas passage 16. After being discharged from the outside reformed gas passage 16, the reformed gas is fed through a collecting tube 17 to a reformed gas outlet nozzle 18, and is then discharged to the outside of the reactor.

As mentioned above, the annular inner tube I is provided between the annular outside reacting portion 13 and the annular inside reacting portion 14 both forming a stock gas passage, and the annular partition plate 35 is provided in the annular inner tube I to form the inside reformed gas passage 15 and the outside reformed gas passage 16, so that heat transfer from the reformed gas to the stock gas may be carried out in a counter flow fashion. Accordingly, heat efficiency can be improved with the reforming apparatus maintained compact.

More specifically, the catalyst filled in the inside reacting portion 14 and the outside reacting portion 13 is heated by the retention heat of the reformed gas flowing in the inside reformed gas passage 15 and the outside reformed gas passage 16, thereby improving the heat efficiency. Further, as the temperature of the reformed gas is reduced, a material cost of refractories or the like for a gas piping can be reduced. Additionally, as the construction of the reforming apparatus can be made simple, an installation cost can be also reduced.

A heat supplying portion B for supplying heat to the stock gas flowing in the reacting portion A is formed in a space surrounded by the annular outer tube O. A burner 41 is provided at an upper central portion of the reforming apparatus so that it is retained through a radiation heat resisting burner tile 42 fixed to the inside surface of the inside circumferential portion 32 of the annular outer tube O. The burner 41 is disposed such that a combustion nozzle thereof is oriented downwardly so as to make an expansion angle of a combustion gas constant.

The combustion gas generated by the burner 41 is guided from a combustion chamber 21 through a gap defined between the lower end of the annular outer tube O and a bottom wall of the reactor to a combustion gas passage 22 formed between the outside circumferential portion 31 of the annular outer tube O and an inner side wall of the reactor. The combustion gas discharged from the combustion gas passage 22 is turned down at its upper end, and is then discharged from a combustion gas outlet nozzle 23 to the outside of the reactor.

During this course, the inside reacting portion 14 is mainly heated through the inside circumferential portion 32 by a radiation heat transfer effect from the combustion chamber 21, while the outside reacting portion 13 is mainly heated through the outside circumferential portion 31 by a convection heat transfer effect in the combustion gas passage 22.

In order to accelerate the heat exchange, a heat transfer material such as alumina balls or Raschig rings may be filled in a part of the combustion chamber 21 and the combustion gas passage 22. Further, in order to reduce a heat loss from the side wall of the reactor, the stock gas inlet nozzle 11 may be located so as to extend along the heat insulating material 44 opposed to the combustion gas passage 22, so that a gas phase heat insulating layer may be formed by the stock gas nozzle 11, and the inlet nozzle 11 may function as a preheating portion for the stock gas.

Figure 2:
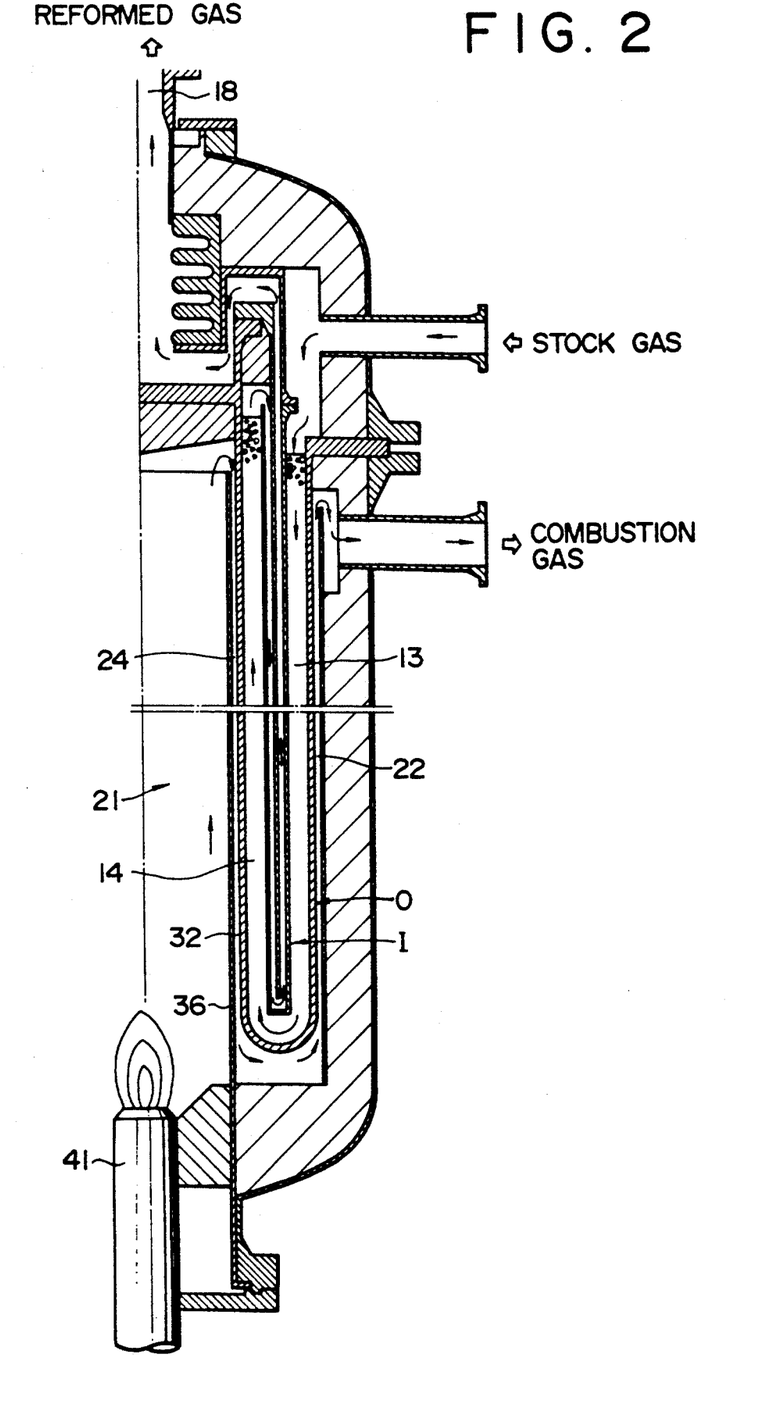
FIG. 2 is a view similar to FIG. 1, showing a second preferred embodiment of the present invention.

Referring next to FIG. 2 which shows a second preferred embodiment of the present invention, the burner 41 is fixedly provided at a lower central portion of the reforming apparatus so that the combustion nozzle is oriented upwardly. Furthermore, an inner cylinder 36 is concentrically provided inside the inside circumferential portion 32 of the annular outer tube O, so that combustion chamber 21 is formed inside the inner cylinder 36, and a combustion gas passage 24 is formed between the inner cylinder 36 and the inside circumferential portion 32. Further, the reformed gas outlet nozzle 18 is located at the upper central portion of the reforming apparatus.

With this construction, the combustion gas generated in the combustion chamber 21 is first raised, and is then turned down at the upper end of the inner cylinder 36 to enter the combustion gas passage 24. Then, the combustion gas flows downwardly in the combustion gas passage 24. Accordingly, the combustion gas passage 24 and the inside reacting portion 14 as the stock gas passage are arranged in a counter flow fashion to exhibit a convection heat transfer effect in the combustion gas passage 24.

As mentioned above, the burner 41 is located at the lower central portion of the reforming apparatus, and the reformed gas outlet nozzle 18 is located at the upper central portion of the reforming apparatus. Therefore, smooth flow of the reformed gas can be ensured with a simple construction, thereby preventing a problem due to turbulent flow of the reformed gas.

Further, as the inner cylinder 36 is provided to thereby form the combustion gas passage 24, both the radiation heat transfer effect and the convection heat transfer effect with respect to the heat supply to the inside circumferential portion 32 can be obtained. Therefore, heat efficiency can be more improved, with the result that the catalyst layer can be shortened to thereby make the reforming apparatus more compact.

Further, it is preferable that the inner cylinder 36 is formed of a heat insulating material having a heat insulation property equal to or greater than that of the reactor tube because the combustion gas having a high temperature contacts the inner cylinder 36.

Figures 3A, 3B:
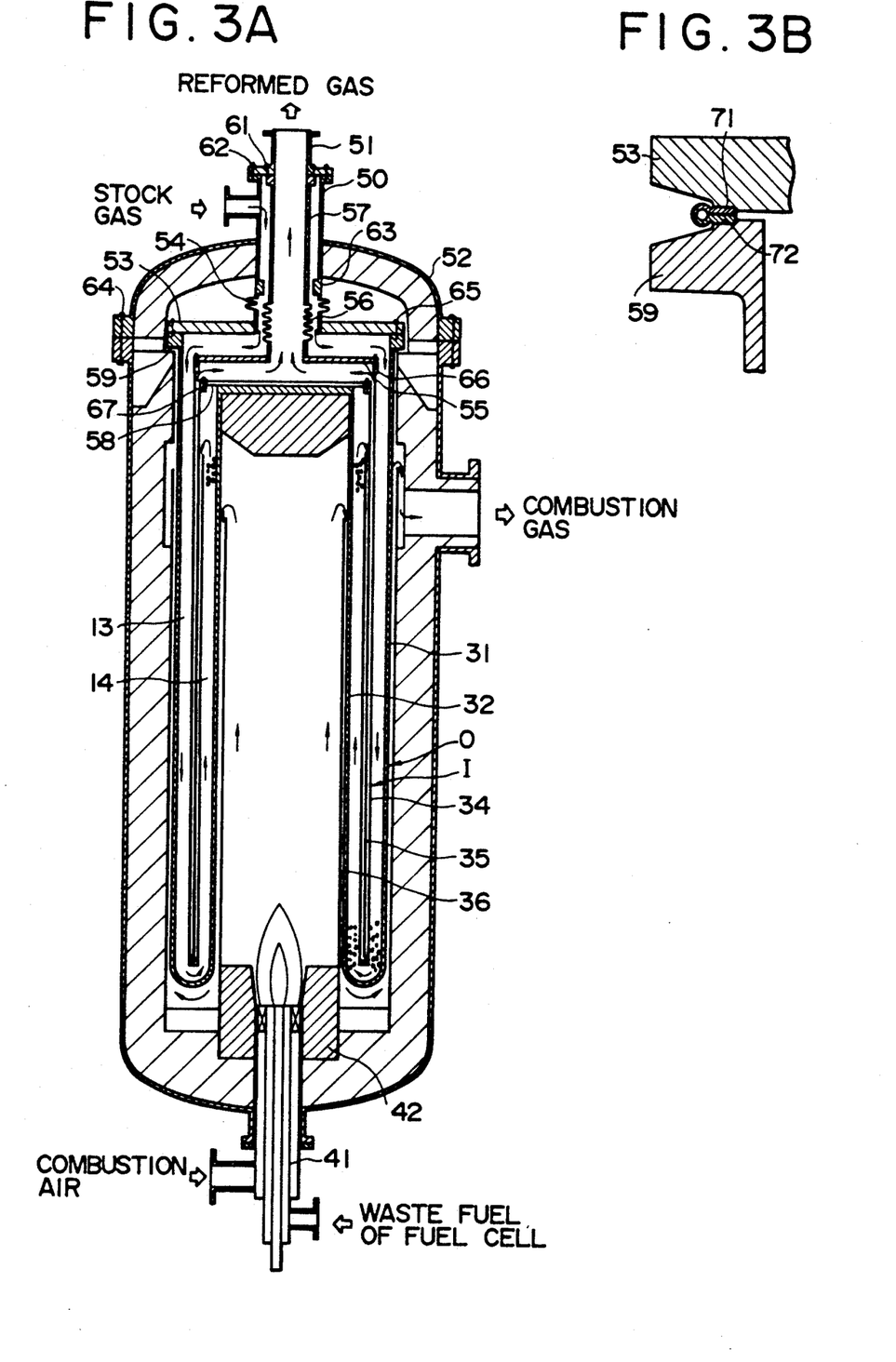
FIG. 3A is a vertical sectional view of a third preferred embodiment of the reforming apparatus according to the present invention.
FIG. 3B is an enlarged sectional view of an essential part shown in FIG. 3A.

Referring to FIGS. 3A and 3B which show a third preferred embodiment of the present invention, the construction is substantially the same as that shown in FIG. 2 except that a flange structure is employed for the purpose of easy exchange of the catalyst and easy checking and exchange of the reactor tube.

That is, the reforming apparatus can be disassembled in accordance with the following procedure.

(1) Nuts 61 and 62 mounted on a flange portion of a reformed gas outlet nozzle 51 are disengaged to remove the reformed gas outlet nozzle 51.
(2) Nuts 63 mounted on a flange portion of a stock gas induction tube 50 and nuts 64 mounted on a flange portion of an upper cover 52 of the reactor are disengaged to remove the upper cover 52.
(3) Nuts 65 mounted on an upper cover 53 for a stock gas passage and a flange portion 59 of the annular outer tube O are disengaged to remove the upper cover 53 and an outer expansion joint 54.
(4) Nuts 66 mounted on an upper outer cover 55 for a reformed gas passage are disengaged to remove the upper outer cover 55, an inner expansion joint 56 and a reformed gas discharge tube 57.
(5) Nuts 67 mounted on an upper inner cover 58 for the reformed gas passage are disengaged to remove the upper inner cover 58.
(6) In this stage, the catalyst filled in the outside reacting portion 13 and the inside reacting portion 14 can be exchanged.
(7) In the case of checking and exchanging the reactor tube, the flange portion 59 of the annular outer tube O is held to upwardly draw the reactor tube.

Thus, the reforming apparatus can be disassembled to thereby make a maintenance work very easy.

In considering gas leakage in the above reforming apparatus having the flange structure, it is permitted from a safety point of view that a combustible gas in the stock gas passage is leaked into that in the reformed gas passage or vice versa. However, it is necessary to surely prevent that the combustible gas is leaked into an exhaust combustion gas in the combustion gas passage area. Accordingly, in the reforming apparatus as shown in FIG. 3A, a high sealability is required at the flange portions fixed by the nuts 63 and 65. At the flange portion fixed by the nuts 63, the sealability can be sufficiently ensured by a normal gasket seal because the temperature at this flange portion is relatively low, and an inner diameter is small. On the other hand, at the flange portion fixed by the nuts 65, the temperature is relatively high, and an inner diameter is large. Therefore, it is preferable that the upper outer cover 53 and the flange portion 59 are seal-welded through seal weld gaskets 71 and 72 as shown in FIG. 3B to ensure the prevention of the gas leakage.

Further, according to the flange structure as mentioned above, a difference in expansion or contraction due to a temperature change of each component in a longitudinal direction thereof can be absorbed. Accordingly, a temperature fluctuation to be generated upon fluctuation in a load of the reforming apparatus can be flexibly followed. Additionally, as the burner 41 can be drawn downwardly in the reforming apparatus shown in FIG. 3A, easy checking and maintenance of the burner 41 can be also ensured.

Figure 4:
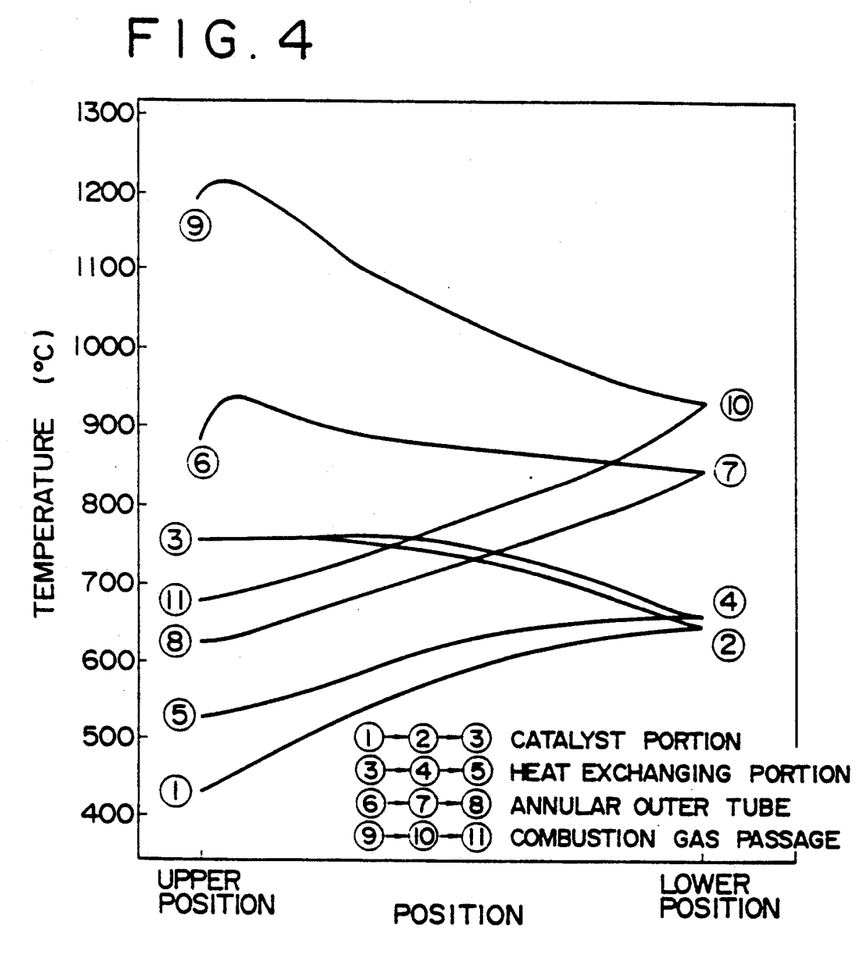
FIGS. 4 and 5 are graphs showing a temperature distribution at various positions in the reforming apparatus shown in FIGS. 1 and 2, respectively.
Figure 5:
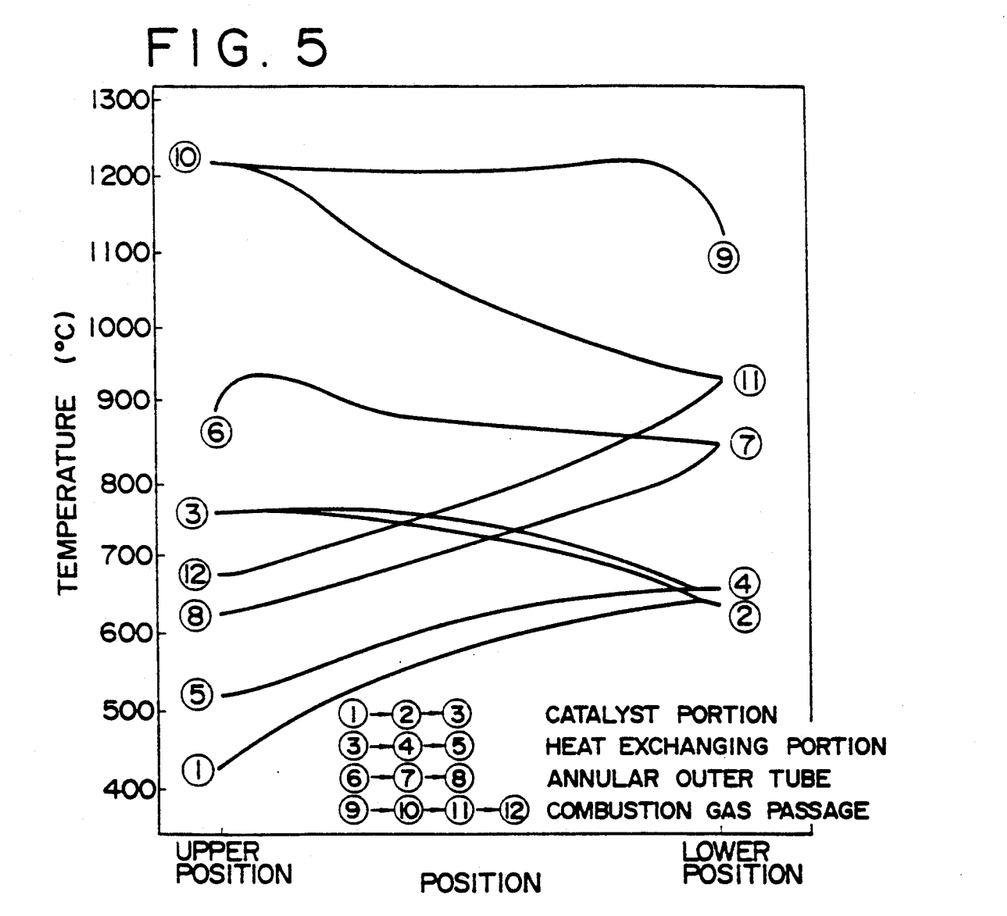

FIGS. 4 and 5 are graphs showing a temperature distribution at various positions in the reforming apparatus shown in FIGS. 1 and 2, respectively.

As apparent from FIGS. 4 and 5, the temperature of the stock gas at the lower position (2) of the outside reacting portion 13 can be increased, and the temperature of the combustion gas at the upper position (11) of the combustion gas discharge passage 22 can be reduced. This is due to the fact that the heat exchange between the stock gas in the outside reacting portion 13 and the combustion gas in the combustion gas discharge passage 22 is carried out by counter-flow heat transfer rather than parallel-flow heat transfer. In this manner, the reforming reaction can be efficiently carried out in an initial stage, thereby reducing an amount of the catalyst and reducing a wall thickness of the heat insulating layer.

Furthermore, the stock gas partially reformed in the outside reacting portion 13 (which stock gas will be hereinafter referred to as a process gas) is fed to the inside reacting portion 14, and the process gas thus obtained is heated by the combustion gas from the heat supplying portion B by the radiation heat transfer effect and/or the convection heat transfer effect. As a result, the temperature of the process gas at the upper position (3) of the inside reacting portion 14 (i.e., at the outlet of the catalyst portion) can be increased. This result is effective especially for an improvement in efficiency of a high-pressure reaction. For example, it is effective for suppression of an unreformed methane concentration in a methane reforming reaction.

Figure 6:
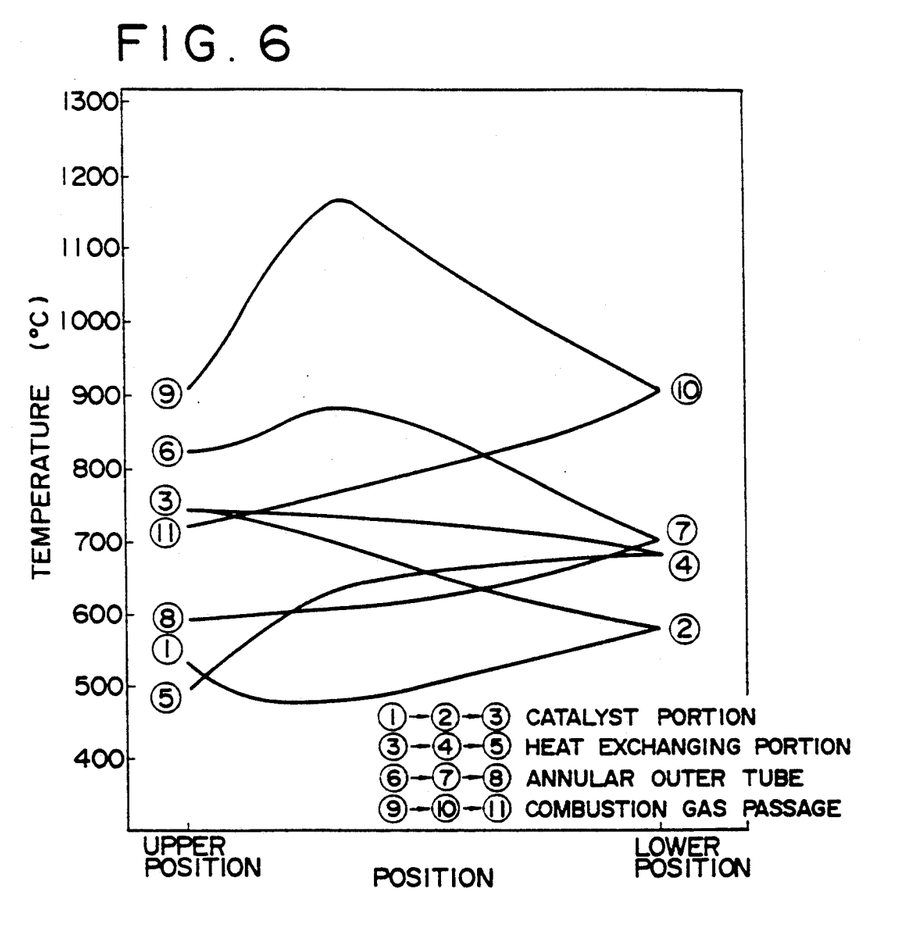
FIG. 6 is a graph similar to FIG. 4, in case of employing another type reforming apparatus according to the present invention.

FIG. 6 is a graph showing a temperature distribution similar to FIGS. 4 and 5, in the case where the reforming apparatus shown in FIG. 1 is designed as a large-scale industrial reforming apparatus of a pressure type 2.5 MW class, and the combustion by the burner is controlled so as not to locally increase a surface temperature of the reactor tube. In the reforming apparatus having the burner located at the upper portion as shown in FIG. 1, the surface temperature of the reactor tube at the upper portion becomes 950° C. or more as apparent in FIG. 4. Accordingly, the material of the reactor tube must be selected from high heat resisting materials in consideration of a change in operational condition. However, by controlling the combustion with use of a burner capable of controlling the combustion, the surface temperature of the reactor tube can be suppressed at 900° C. or less as apparent in FIG. 6. Accordingly, a maximum temperature of the reactor tube can be reduced even in the counter flow type reforming apparatus as shown in FIG. 1.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A reforming apparatus for hydrocarbon comprising:
   means for defining a first annular passage connected to a stock gas inlet conduit and forming an outside stock gas passage filled with a catalyst for reforming a stock gas;
   means for defining a second annular passage connected to a reformed gas exit conduit and arranged just inside of said first annular passage in concentric relationship therewith, forming an outside reforming gas passage;
   means for defining a third annular passage arranged just inside of said second annular passage in concentric relationship therewith, forming an inside reformed gas passage;
   means for defining a fourth annular passage arranged just inside of said third annular passage in concentric relationship therewith, forming an inside stock gas passage filled with said catalyst for reforming said stock gas;
   means for defining a first communicating portion for communicating an axial end of said first annular passage with an axial end of said fourth annular passage to guide said stock gas from said outside stock gas passage to said inside stock gas passage;
   means for defining a second communicating portion for communicating another axial end of said fourth annular passage with an axial end of said third annular passage to guide a reformed gas generated from said inside stock gas passage to said inside reformed gas passage;
   means for defining a third communicating portion for communicating another axial end of said third annular passage with an axial end of said second annular passage to guide said reformed gas from said inside reformed gas passage to said outside reformed gas passage;
   means for defining a first combustion gas passage formed just inside of said fourth annular passage, for heating said fourth annular passage; and
   means for defining a second combustion gas passage formed just outside of said first annular passage, for heating said first annular passage;
   wherein said apparatus is constructed so that a flow direction of said stock gas in said outside stock gas passage is counter to that of a combustion gas in said second combustion gas passage; a flow direction of said stock gas in said inside stock gas passage is counter to that of a combustion gas in said first combustion gas passage; a flow direction of said reformed gas in said inside reformed gas passage is counter to that of said stock gas in said inside stock gas passage; and a flow direction of said reformed gas in said outside reformed gas passage is counter to that of said stock gas in said outside stock gas passage.

2. The reforming apparatus as defined in claim 1, wherein said first combustion gas passage forms a combustion chamber, and a burner for generating said combustion gas is provided in said combustion chamber in such a manner that a combustion nozzle of said burner is oriented downwardly.

3. The reforming apparatus as defined in claim 1, wherein an inner cylinder is provided inside of said fourth annular passage to define a combustion chamber inside of said inner cylinder and define said first combustion gas passage inside of said fourth annular passage, and a burner for generating said combustion gas is provided in said combustion chamber in such a manner that a combustion nozzle of said burner is oriented upwardly.

* * * * *

UNITED STATES PATENT AND TRADEMARK OFFICE
CERTIFICATE OF CORRECTION

PATENT NO. : 5,226,928
DATED : JULY 13, 1993
INVENTOR(S) : Teruo MAKABE ET AL

It is certified that error appears in the above-identified patent and that said Letters Patent is hereby corrected as shown below:

Column 6, between lines 26 and 27, insert the following paragraph:

insert

--In Figure 4, (1) is the upper position of the annular outside reacting portion; (2) is the lower position of the annular outside reacting portion; (3) is the upper position of the annular inside reacting portion; (4) is the lower position of the annular inside reformed gas passage; (5) is the upper position of the annular outside reformed gas passage; (6) is the upper position of the inside circumferential portion of the annular outer tube; (7) is the lower position of the outside circumferential portion of the annular outer tube; (8) is the upper position of the outside circumferential portion of the annular outer tube; (9) is the

UNITED STATES PATENT AND TRADEMARK OFFICE
CERTIFICATE OF CORRECTION

PATENT NO. : 5,226,928
DATED : JULY 13, 1993
INVENTOR(S) : Teruo MAKABE ET AL

It is certified that error appears in the above-indentified patent and that said Letters Patent is hereby corrected as shown below:

upper position of the combustion chamber; (10) is the lower position of the combustion chamber; (11) is the upper position of the combustion gas discharge passage.--

Signed and Sealed this

Nineteenth Day of April, 1994

Attest:

BRUCE LEHMAN

*Attesting Officer*  *Commissioner of Patents and Trademarks*